(12) United States Patent
Scholer et al.

(10) Patent No.: US 7,051,831 B2
(45) Date of Patent: May 30, 2006

(54) METHOD AND APPARATUS FOR MAINTAINING A CONNECTION BETWEEN A VEHICLE AND A FUEL SOURCE

(75) Inventors: Richard Allen Scholer, Farmington Hills, MI (US); Anthony Wayne Renko, New Boston, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 249 days.

(21) Appl. No.: 10/458,397

(22) Filed: Jun. 10, 2003

(65) Prior Publication Data
US 2004/0011583 A1    Jan. 22, 2004

Related U.S. Application Data

(63) Continuation-in-part of application No. 09/682,354, filed on Aug. 24, 2001, now abandoned.

(51) Int. Cl.
*B60K 28/00* (2006.01)
*B60K 28/10* (2006.01)
(52) U.S. Cl. ...................... 180/286; 180/271
(58) Field of Classification Search ............... 180/286, 180/271, 281
See application file for complete search history.

(56) References Cited

U.S. PATENT DOCUMENTS

| 2,163,292 | A | * | 6/1939 | Sassoon et al. | ............. 180/286 |
| 2,166,060 | A | * | 7/1939 | Kirk | ............................ 70/170 |
| 3,026,004 | A | | 3/1962 | Rowell | |
| 4,942,937 | A | | 7/1990 | Amberger et al. | |
| 5,635,770 | A | | 6/1997 | Evans, Jr. et al. | |
| 6,021,823 | A | | 2/2000 | Hale | |
| 6,081,042 | A | | 6/2000 | Tabata et al. | |
| 6,098,733 | A | | 8/2000 | Ibaraki et al. | |
| 6,114,775 | A | | 9/2000 | Chung | |
| 6,176,807 | B1 | | 1/2001 | Oba | |
| 6,712,171 | B1 | * | 3/2004 | Farmer | ....................... 180/286 |

* cited by examiner

*Primary Examiner*—Eric Culbreth
(74) *Attorney, Agent, or Firm*—David B. Kelly; Brooks & Kushman

(57) ABSTRACT

An apparatus 10 which allows a transmission 18 to be selectively shifted from a parked gear arrangement to another gear arrangement when the fuel door 13 is closed and the brake pedal 22 is depressed, and which allows a parked vehicle 12 to remain stationary as fuel is being delivered to a fuel tank 33.

10 Claims, 2 Drawing Sheets

METHOD AND APPARATUS FOR MAINTAINING A CONNECTION BETWEEN A VEHICLE AND A FUEL SOURCE

CROSS-REFERENCE TO RELATED APPLICATION

This application is a continuation-in-part of U.S. application Ser. No. 09/682,354, filed Aug. 24, 2001 now abandoned.

BACKGROUND OF THE INVENTION

1. Field of the Invention

The invention relates to a method and an apparatus for maintaining a connection between a vehicle and a fuel source and for causing a vehicle to remain in a parked state when the vehicle is being fueled.

2. Background Art

Typically, a "non-electrically powered" vehicle includes a fuel tank, which receives fuel and stores it until it is delivered to and used by a torque generator, such as an internal combustion engine. This type of vehicle normally includes a generally hollow pipe or conduit (a vehicular fuel reception conduit) having a first end, which is physically coupled to the fuel tank, and a second open end, which allows fuel to be delivered into the fuel tank. The open end typically receives a selectively removable fuel cap, which prevents contaminants from entering the fuel tank. The vehicle further typically includes a fuel door, which is selectively movable between a closed position wherein the fuel door overlays the open end of the vehicular fuel reception conduit and the fuel cap, and an open position in which the fuel cap is exposed, allowing the fuel cap to be removed and to allow for the open end of the vehicular fuel reception conduit to be coupled to a source of fuel or energy.

While there exist a wide variety of connection arrangements or configurations that allow fuel to be delivered into the fuel tank, each of these requires the vehicle to remain substantially stationary while receiving fuel. For example, a gasoline fuel source or pump typically includes a conduit or hose, which is removably placed within and received by the vehicular fuel reception conduit. The hose and the vehicular fuel reception conduit therefore cooperate to allow the gasoline to be received within the vehicle fuel tank. In contrast to this gasoline coupling configuration, a hydrogen fuel source typically is mechanically locked onto the vehicular fuel reception conduit (or other portion of the vehicle) while hydrogen fuel is delivered to the fuel tank. This ensures that an integral connection is created and maintained, thereby reducing the likelihood of fuel leakage.

It is not desirable to move the vehicle while it is coupled to the fuel source because such movement may break the fuel connection and cause damage to the fuel source and to the vehicle, especially if the fuel source is locked onto the vehicular fuel reception conduit. In order to reduce the likelihood of such undesirable movement, various configurations exist to disable the vehicle during fueling (i.e., devices to prevent the vehicle from moving) in the event that the fuel door is opened, which would be indicative of fuel being delivered to the vehicle's fuel tank. Particularly, these devices interrupt transfer of torque from the engine (or from some other torque generator) to the wheels when the fuel door is opened, thereby disabling the vehicle (e.g., preventing movement of the vehicle).

SUMMARY OF THE INVENTION

The present invention provides a method and an apparatus for keeping a vehicle stationary when fuel is being delivered to the vehicle fuel tank.

A first feature of the present invention comprises an apparatus having a first portion that senses movement of a portion of a vehicle (e.g., a fuel door); and a second portion that causes the vehicle to be stationary.

A second feature of the present invention comprises a vehicle having a movable fuel door and a transmission assembly. The transmission assembly may be selectively shifted from a parked gear arrangement to another gear arrangement. A selectively movable shifting member is coupled to the transmission assembly. Movement of the fuel door causes the shifting member to maintain a certain position, thereby preventing the transmission from being moved from the parked gear arrangement.

A third feature of the present invention comprises a method for operating a vehicle of the type having a selectively movable fuel door and a selectively shiftable transmission assembly. The method includes the steps of sensing the position of the fuel door and preventing shifting of the transmission when the fuel door is in a certain position.

The following detailed description and drawings describe an embodiment of the invention.

DETAILED DESCRIPTION OF THE PREFERRED EMBODIMENTS

Figure 1:
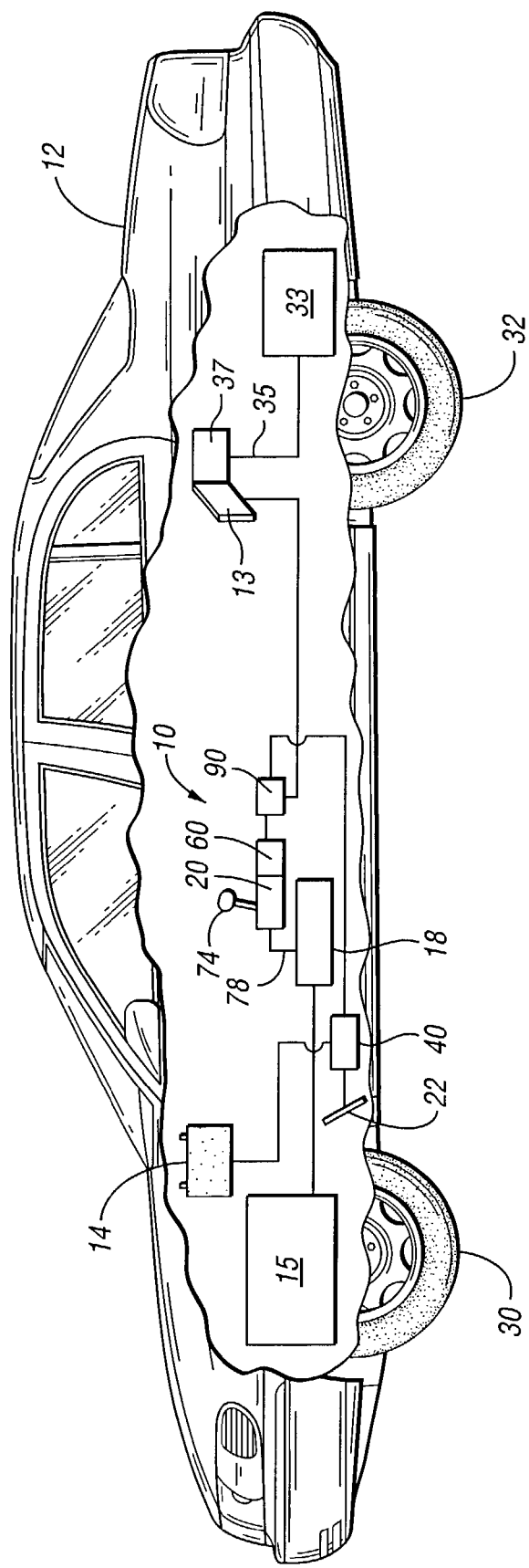
FIG. 1 is a block diagram of an apparatus operatively disposed within a vehicle in accordance with the teachings of an embodiment of the invention.
Figure 2:
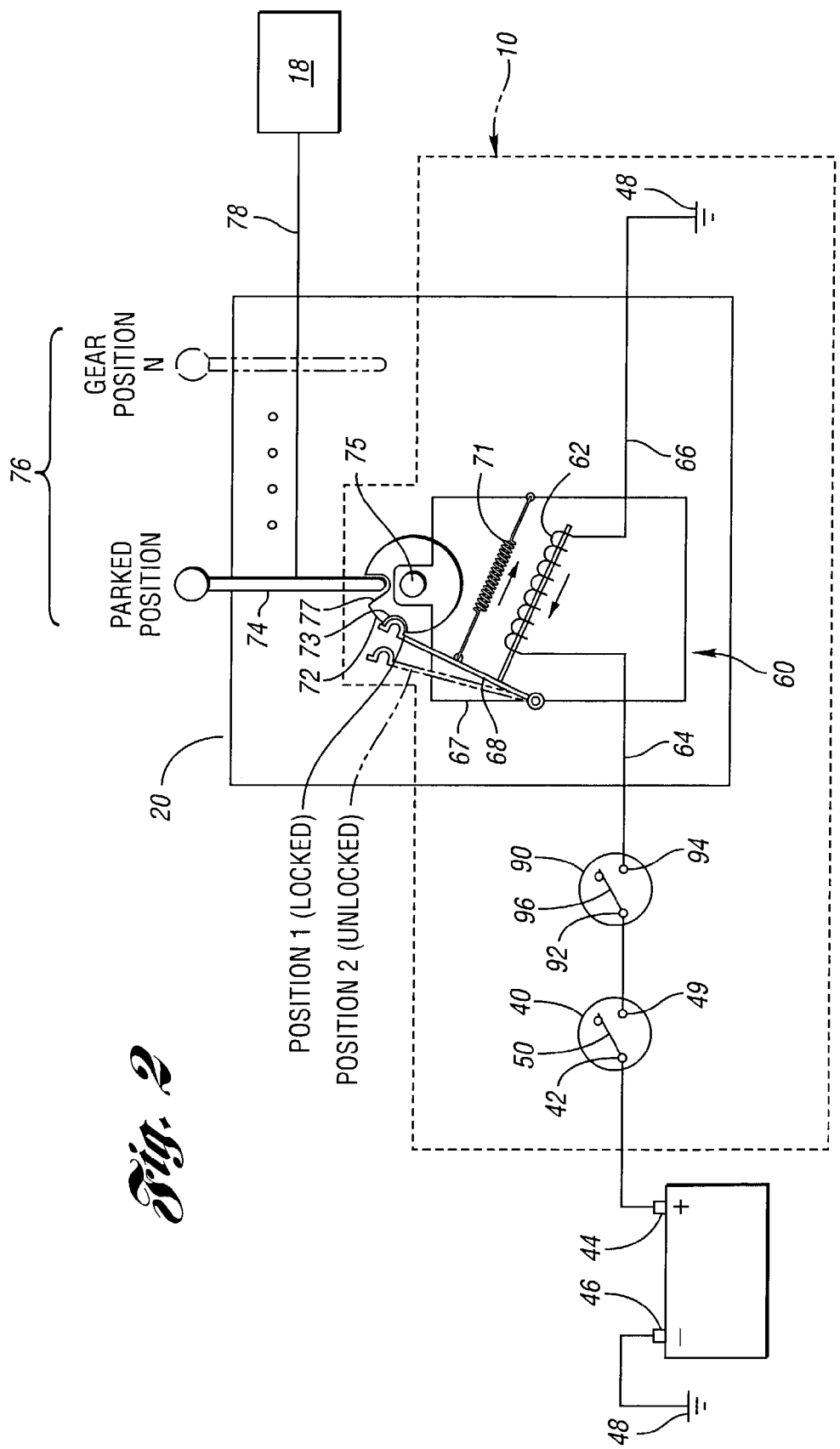
FIG. 2 is a schematic diagram of the apparatus of the embodiment of the invention shown in FIG. 1 in combination with a shift assembly.

Referring now to FIGS. 1 and 2, there is shown an apparatus 10, which is made in accordance with the teachings of the invention and which is operatively disposed within a vehicle 12.

Particularly, vehicle 12 is of the type having an electrical battery 14, a torque generator 15 (e.g., an internal combustion engine), a transmission assembly 18, a transmission gearshift assembly 20, a selectively depressible brake pedal or member 22, a pair of front wheels 30, a pair of rear wheels 32, a selectively movable fuel door 13, a fuel tank 33, and a fuel conduit 35. It should be appreciated that only the relevant portions of the vehicle 12 (such as the gearshift assembly 20 and the transmission 18) are shown.

As should be appreciated by those of ordinary skill in the art, the transmission assembly 18 is coupled to and receives torque from the torque generator 15. The transmission assembly delivers at least a portion of the received torque to the front wheels 30 (in a front wheel drive configuration), the rear wheels 32 (in a rear wheel drive configuration), or to both sets of wheels 30, 32 (in an all wheel drive configuration). Gearshift assembly 20 includes a movable member 74, which may selectively occupy certain predetermined positions 76 (seen in FIG. 2), each of which corresponds to a unique transmission gear position.

The gearshift assembly 20 is coupled to the transmission 18 by member/assembly or bus 78, and movement of the assembly 20 causes the transmission 18 to shift from one gear arrangement to another. That is, as should be appreciated by those of ordinary skill in the art, transmission 18 may comprise a bus, which receives a signal from the shift assembly 20 indicating the occurrence of a shifting movement of member 74 and causes this signal to be communicated to a controller (not shown). This causes the desired shifting to occur within the transmission 18. Alternatively, transmission 18 may comprise an assembly that mechanically causes the desired shifting to occur within the transmission 18 in response to the movement of member 74.

Fuel tank 33 is coupled to the conduit 35. More particularly, conduit 35 couples the interior of the fuel tank 33 with opening 37. The opening 37 is created within or through the body of the vehicle 12 and is selectively covered by the fuel door 13.

As shown best in FIG. 2, the apparatus 10 further includes a brake switch assembly 40 having a first terminal 42, which is coupled to the positive terminal 44 of the battery 14. The negative terminal 46 of the battery 14 is coupled to electrical ground potential 48. Further, a brake switch 40 includes a second terminal 49 and a member 50, which is coupled to the terminal 42 and to the brake pedal 22. Particularly, member 50 is movable in response to depression of the brake pedal 22 from a first open position, which is shown in FIG. 2 and in which the member 50 is remote from the terminal 49, to a second closed position in which the member 50 couples the terminal 42 to terminal 49.

The apparatus 10 further includes a second switch 90, which includes a first terminal 92 coupled to terminal 49 and a second terminal 94. The switch 90 also includes a member 96, which is movably coupled to the terminal 92 and to the fuel door 13. Particularly, member 96 is movable, in response to opening of the fuel door 13, from a closed position in which the member 96 couples the terminal 92 to the terminal 94, to an open position shown in FIG. 2, in which the member 96 is remote from the terminal 94. Hence, switches 40 and 90, respectively, sense movement of the brake pedal 22 and the fuel door 13.

The apparatus 10 further includes a cam member 72, which may be of any desired shape, and which is pivotally deployed within the shift assembly 20 by axle member 75. Apparatus 10 also includes a solenoid or relay assembly 60, which is enclosed within housing 67. Particularly, housing 67 is disposed within the shift assembly 20 and cam member 72 is received within the housing 67.

Relay assembly 60 includes an inductor or electrical coil 62 with a first terminal 64, which is coupled to the terminal 94, and a second terminal 66 coupled to the electrical ground potential 48. Solenoid 60 further includes a movable member 68, which is pivotally coupled to the relay housing 67 and which is normally biased against the cam member 72 by spring 71 (which is coupled to housing 67), thereby causing a detent end of movable member 68 to enter recess 73 on cam member 72 when the member 74 resides at a parked position as the end of member 74 is received, as shown, in a recess 77 on cam member 72. This substantially prevents the member 74 from being moved from this first or parked position, thereby preventing the transmission assembly 18 from being shifted from the parked gear state or arrangement.

In operation, the selective depression of the brake member 22 causes member 50 of switch 40 to occupy a closed position, which causes electrical power provided by the battery 14 to be delivered to the terminal 49. Closure of the fuel door 13 causes the member 96 to connect the terminal 92 to the terminal 94. Hence, if the fuel door 13 is closed and the brake member 22 is depressed, electrical power is provided by the battery 14 to the terminal 94 (i.e., electrical power is delivered from terminal 49 to the terminal 94 through the member 96). Electrical power is delivered to the inductor 62 through terminal 64 and causes the inductor 62 to generate an electric flux field, which causes the locking member 68 to occupy an unlocked open position (i.e., it moves away, as shown by the directional arrows from the cam member 72 against the force of the spring 71), thereby allowing the shift assembly 20 to be moved from the parked position to another gear position. This allows the vehicle 12 to be moved (e.g., allows the transmission 18 to be shifted from a parked state to another gear state by the movement of the member 74 of the shift assembly 20). The inductor, when energized, pushes the locking member in a counterclockwise direction.

The member 74, when it is moved from the park position with member 68 in its unlocked position, forces cam member 72 to rotate sufficiently on axle member 75 to allow the end of member 74 to exit recess 77. A limited amount of friction at the rotary support of cam member 72 by axle member 75 prevents free rotary movement of cam member 72 when the end of member 74 is displaced from recess 77. When member 74 is returned to the park position, the end of member 74 will reenter recess 77 and rotate cam member 72 to the position shown in FIG. 2.

Thus, in the disclosed embodiment of the invention, the fuel door 13 must be closed and the brake member 22 must be depressed (e.g., the vehicle 12 must be stationary) in order to allow the transmission assembly 18 to be selectively shifted from the parked state. Thus, assembly 10 causes the vehicle 12 to be stationary or to remain in a parked state if the fuel door 13 is opened when the vehicle 12 is in a parked state or is stationary. It should be appreciated that the fueling state (e.g., the state in which fuel is being delivered to the vehicle 12) may be sensed in many ways, such as by a switch that is opened when the fuel conduit is locked onto the vehicle 12 or by a sensor that senses delivery of fuel into the fuel conduit. Such an alternate switch or sensor then provides a path from terminal 49 to terminal 64 when the fuel conduit is removed from the vehicle.

Apparatus 10 may be adapted to prevent the shifting assembly 20 (and the transmission 18) from exiting the parked gear position or state, while allowing shifting assembly 20 (and the transmission 18) to enter the parked gear position or gear state from another position or gear state even when the fuel door 13 is open (e.g., an override switch may be used to supply power to the inductor 62 in order to allow the member 74 to be readily moved into the parked position). A spring 71 may be chosen such that the effect of the force exerted by the spring 71 may be overcome by the operator in order to assist in moving the member 74 to the parked position, or the path to enter the parked position may not be the same as the path to exit the parked position).

Moreover, it should be appreciated that in a manual transmission type arrangement, the switch 96 may be coupled to a controller (not shown) or another assembly which prevents the torque from being communicated to the wheels 30, 32 when the fuel door 13 is opened. Further, in yet another embodiment of the invention, switch assembly 40 may be eliminated.

Although embodiments of the invention have been disclosed, it will be apparent to persons skilled in the art that modifications may be made without departing from the scope of the invention. All such modifications and equivalents thereof are intended to be covered by the following claims.

What is claimed:

1. An apparatus for use with a vehicle comprising:
a first portion of the that determines whether the vehicle is in a fueling state and a second portion that causes the vehicle to be stationary when the vehicle is in a fueling state;
the first portion of the apparatus comprising a fuel door and a fuel door switch, the second portion causing the vehicle to be stationary in response to the determination of whether the vehicle is in a fueling state;
the fuel door switch having a first position and a second position, the fuel door switch being movable between the first and second positions in response to movement of the fuel door to activate and deactivate the second portion of the apparatus;
the vehicle including a transmission shifting assembly;
the second portion of the apparatus including a relay assembly, which is coupled to the fuel door switch, and a movable cam coupled to the relay assembly, which prevents movement of the shifting assembly.

2. The apparatus of claim 1 wherein the cam prevents movement of the shifting assembly from a parked position.

3. The apparatus of claim 2 wherein the relay assembly comprises an inductor and a member that is normally biased against the cam.

4. The apparatus of claim 3 wherein the vehicle further includes a selectively depressible brake pedal, and a brake switch, which is coupled to the selectively depressible brake pedal and to the fuel door switch and which is effective to allow the shifting assembly to move when the brake pedal is depressed.

5. The apparatus of claim 4 wherein the fuel door switch and the brake switch cooperatively allow the shifting assembly to move from the parked position when the brake pedal is depressed and the fuel door is closed.

6. A vehicle having a movable fuel door; a transmission assembly that may be selectively shifted from a parked gear arrangement to another gear arrangement; a selectively movable shifting member coupled to the transmission assembly; and a switching assembly coupled to the selectively movable shifting member and to the transmission assembly, the switching assembly sensing movement of the fuel door, which causes the shifting member to maintain a certain position in response to the sensed movement of the fuel door, thereby preventing the transmission from being shifted from the parked gear arrangement;
the switching assembly comprising a switch, a relay assembly coupled to the switch, and a cam coupled to the relay assembly and to the shifting member.

7. A vehicle having a movable fuel door; a transmission assembly that may be selectively shifted from a parked gear arrangement to another gear arrangement; a selectively movable shifting member coupled to the transmission assembly; and a switching assembly coupled to the selectively movable shifting member and to the transmission assembly, the switching assembly sensing movement of the fuel door, which causes the shifting member to maintain a certain position in response to the sensed movement of the fuel door, thereby preventing the transmission from being shifted from the parked gear arrangement;
the switching assembly comprising a switch, a relay assembly coupled to the switch, and a cam coupled to the relay assembly and to the shifting member;
the relay assembly comprising an inductor, and a selectively movable locking member biased against the cam.

8. A vehicle having a movable fuel door; a transmission assembly that may be selectively shifted from a parked gear arrangement to another gear arrangement; a selectively movable shifting member coupled to the transmission assembly; and a switching assembly coupled to the selectively movable shifting member and to the transmission assembly, the switching assembly sensing movement of the fuel door, which causes the shifting member to maintain a certain position in response to the sensed movement of the fuel door, thereby preventing the transmission from being shifted from the parked gear arrangement;
the switching assembly comprising a switch, a relay assembly coupled to the switch, and a cam coupled to the relay assembly and to the shifting member;
the relay assembly comprising an inductor, and a selectively movable locking member biased against the cam;
the cam including a detent recess that receives the selectively movable locking member.

9. A vehicle having a movable fuel door; a transmission assembly that may be selectively shifted from a parked gear arrangement to another gear arrangement; a selectively movable shifting member coupled to the transmission assembly; and a switching assembly coupled to the selectively movable shifting member and to the transmission assembly, the switching assembly sensing movement of the fuel door, which causes the shifting member to maintain a certain position in response to the sensed movement of the fuel door, thereby preventing the transmission from being shifted from the parked gear arrangement;
the switching assembly comprising a switch, a relay assembly coupled to the switch, and a cam coupled to the relay assembly and to the shifting member;
the relay assembly comprising an inductor, and a selectively movable locking member biased against the cam;
the cam including a detent recess that receives the selectively movable locking member;
the vehicle further comprising a selectively depressible brake pedal, and a brake switch coupled to the brake pedal and to the switching assembly, the brake switch being effective to cause the locking member to maintain a certain position when the brake is released.

10. A vehicle having a movable fuel door; a transmission assembly that may be selectively shifted from a parked gear arrangement to another gear arrangement; a selectively movable shifting member coupled to the transmission assembly; and a switching assembly coupled to the selectively movable shifting member and to the transmission assembly, the switching assembly sensing movement of the fuel door, which causes the shifting member to maintain a certain position in response to the sensed movement of the fuel door, thereby preventing the transmission from being shifted from the parked gear arrangement;
the switching assembly comprising a switch, a relay assembly coupled to the switch, and a cam coupled to the relay assembly and to the shifting member;
the relay assembly comprising an inductor, and a selectively movable locking member biased against the cam;
the cam including a detent recess that receives the selectively movable locking member;
the vehicle further comprising a selectively depressible brake pedal, and a brake switch coupled to the brake pedal and to the switching assembly, the brake switch being effective to cause the locking member to maintain a certain position when the brake is released;
the switching assembly and the brake switch cooperatively allowing the locking member to be moved from the certain position when the brake pedal is depressed and the fuel door is closed.

* * * * *